United States Patent [19]
Yamashita

[11] Patent Number: 5,760,853
[45] Date of Patent: Jun. 2, 1998

[54] LIQUID CRYSTAL LIGHT VALVE WITH DIELECTRIC MIRROR CONTAINING SEMICONDUCTOR OXIDE, FERROELECTRIC MATERIAL OR CONDUCTIVE MATERIAL

[75] Inventor: Hidehiko Yamashita, Yamatokoriyama, Japan

[73] Assignee: Sharp, Kabushiki Kaisha, Osaka, Japan

[21] Appl. No.: 516,397

[22] Filed: Aug. 17, 1995

[30] Foreign Application Priority Data

Aug. 31, 1994 [JP] Japan ................. 6-207215

[51] Int. Cl.$^6$ ........................... G02F 1/135
[52] U.S. Cl. ................................ 349/30
[58] Field of Search ............... 349/30, 24, 114, 349/29

[56] References Cited

U.S. PATENT DOCUMENTS

| | | | |
|---|---|---|---|
| 4,012,119 | 3/1977 | Adams et al. | 349/30 |
| 5,245,453 | 9/1993 | Hatano et al. | 349/27 |
| 5,272,554 | 12/1993 | Ji et al. | 349/27 |
| 5,434,689 | 7/1995 | Shigeta et al. | 349/30 |

FOREIGN PATENT DOCUMENTS 4-281401  10/1992  Japan.

OTHER PUBLICATIONS

"Thin Films & Their Applications in Opto-Electronics", *Optronics*, the first impression of the revised and enlarged edition, Aug. 31, 1992, pp. 259–260.

*Primary Examiner*—Anita Pellman Gross
*Assistant Examiner*—Kenneth Parker
*Attorney, Agent, or Firm*—David G. Conlin; William J. Daley, Jr.

[57] ABSTRACT

A liquid crystal light valve includes a transparent substrate having a transparent electrode, a photoconducting layer and a dielectric mirror layer including a plurality of dielectric films formed in this order on a surface thereof, a transparent substrate having a transparent electrode formed on a surface thereof, and a liquid crystal layer held between the transparent substrates. The dielectric mirror layer includes a high packing density portion as the outermost layer on the liquid crystal layer side, and a low packing density portion with a packing density lower than that of the high packing density portion. This structure improves the optical characteristic and the manufacturing efficiency of the liquid crystal light valve.

18 Claims, 9 Drawing Sheets

5,760,853

LIQUID CRYSTAL LIGHT VALVE WITH DIELECTRIC MIRROR CONTAINING SEMICONDUCTOR OXIDE, FERROELECTRIC MATERIAL OR CONDUCTIVE MATERIAL

FIELD OF THE INVENTION

The present invention relates to a liquid crystal light valve for use in a projection-type liquid crystal display device, an optical computer, a wavelength converter, etc.

BACKGROUND OF THE INVENTION

In recent years, there is an increasing demand for a projection-type large screen display for use in presentations, showing movies and videos, and so on. Improvements in brightness and definition of such a projection-type display are desired. In particular, the development of liquid crystal light valves has been actively carried out so as to improve the brightness and definition of projection-type displays. For example, as illustrated in FIG. 15, a liquid crystal light valve 900 includes a transparent substrate 902 having a transparent electrode 904 and an alignment film 909 formed thereon in this order, a transparent substrate 901 having a transparent electrode 903, a photoconducting layer 905, a light blocking layer 906, a dielectric mirror layer 907 and an alignment film 908 formed thereon in this order, and a liquid crystal layer 910 held between the transparent substrates 902 and 901.

An equivalent circuit for the liquid crystal light valve 900 is shown in FIG. 16. In this equivalent circuit, the equivalent capacitances and equivalent resistances of the liquid crystal layer 910, dielectric mirror layer 907, light blocking layer 906 and photoconducting layer 905 are represented by $C_{LC}$, $C_{DM}$, $C_{LB}$, $C_{PC}$, $R_{LC}$, $R_{DM}$, $R_{LB}$ and $R_{PC}$, respectively.

The impedance, $Z_{PC}$, $Z_{LB}$, $Z_{DM}$, $Z_{LC}$, of the photoconducting layer 905, light blocking layer 906, dielectric mirror layer 907 and liquid crystal layer 910, is determined by $C_{PC}$ and $R_{PC}$, $C_{LB}$ and $R_{LB}$, $C_{DM}$ and $R_{DM}$, and $C_{LC}$ and $R_{LC}$, respectively. Therefore, in the liquid crystal light valve 900, a voltage is divided by the respective layers according to the ratio of the impedance $Z_{PC}$, $Z_{LB}$, $Z_{DM}$ and $Z_{LC}$.

In the event when write light 911 (see FIG. 15) is not applied to the photoconducting layer 905 (in the dark state), the equivalent resistance $R_{PC}$ of the photoconducting layer 905 becomes higher, and the impedance $Z_{PC}$ increases. On the other hand, when the write light 911 is applied to the photoconducting layer 905 (in the bright state), the equivalent resistance $R_{PC}$ of the photoconducting layer 905 becomes smaller, and the impedance $Z_{PC}$ decreases. Namely, the equivalent resistance $R_{PC}$ of the photoconducting layer 905 is variable.

The photoconducting layer 905 varies a voltage to be applied to the liquid crystal layer 910 as the impedance changes. Therefore, in order to efficiently transmit the change in the impedance of the photoconducting layer 905 to the liquid crystal layer 910, it is necessary to decrease the impedance $Z_{DM}$ and $Z_{LB}$ of the dielectric mirror layer 907 and light blocking layer 906.

With an efficient transmission of the change in the impedance of the photoconducting layer 905 to the liquid crystal layer 910, it is possible to form an image with a reduced amount of write light, improving the write light sensitivity. Moreover, since the variation in the applied voltage to the liquid crystal layer 910 is increased, it is possible to improve the contrast of the image.

Various filters are formed by laminating optical thin films using interference of light, such as a dielectric mirror, a dielectric interference filter, and reflection reducing film. Such filters have advantages, for example, a high degree of freedom in using optical characteristic, efficient use of light, and high durability. Thus, the filters are widely used in the field of optics. The filters are formed by laminating optical films with electron-beam evaporation.

However, the filters suffer from a serious problem that the optical characteristic are varied when the optical thin films absorb moisture. This is caused because the deposited dielectric film is porous. As to the reflection reducing film, for example, when the humidity changes depending on the season and working environment, the peak of the spectral reflectance characteristic varies, and a slight reflection color which is visible by human eyes changes from green to reddish green or to bluish green.

In general, since a dielectric mirror layer used for a liquid crystal light valve is a laminated optical thin film, the spectral reflectance characteristic and impedance vary with changes in the environment and time. The variation in the spectral reflectance characteristic causes a disparity in the characteristics of liquid crystal light valve products. As a result, the stability of the product quality is lowered, and the yield of products with stable quality is decreased.

Moisture absorbed by the dielectric mirror layer usually contains impurities, thereby lowering the reliability of liquid crystals.

The following methods are used to solve the above problems. A deposition method employing ion-beam plating, disclosed in Japanese Publication for Unexamined Patent Application No. 281401/1992 (Tokukaihei 4-281401). An ion-beam assisted deposition (IAD), disclosed in Thin-Film Engineering Manual, Optronics.

In the deposition method employing ion-beam plating, the outermost layer of a multi-layer reflection reducing film, which is in contact with air, is formed by ion-beam plating so that the outermost layer has a high packing density and is chemically stable. When IAD is used for forming an optical thin film, the resulting film is dense and has a higher packing density. It is thus possible to reduce the amount of moisture absorbed by the thin film and to decrease the variation in the optical characteristic. The packing density is a ratio of a substantial film portion to the entire film volume including a void.

With the use of ion plating or IAD, it is possible to form a dense film with a high packing density, thereby preventing changes in the optical characteristic and impedance.

However, when the dense film with a high packing density is formed by ion-beam plating or IAD, the impedance is also increased. Therefore, when a film with a high packing density is used for the dielectric mirror layer of the liquid crystal light valve, the impedance becomes higher than that of a dielectric mirror layer formed by electron-beam evaporation, causing a voltage drop in the dielectric mirror layer. As a result, the photosensitivity and the contrast of the image deteriorate.

Moreover, when the impedance of the dielectric mirror layer becomes higher, the drive voltage of the liquid crystal valve should also be increased.

The above-mentioned problems also arise even with the use of a dielectric mirror layer in which only the outermost layer is formed by a film with a high packing density. The use of such a dielectric mirror layer impairs the display performance of the liquid crystal light valve.

SUMMARY OF THE INVENTION

It is an object of the present invention to provide a liquid crystal light valve with good display performance by using a dielectric mirror layer showing less changes in the spectral reflectance characteristic (hereinafter referred to as optical characteristic) and in the impedance with time.

In order to achieve the above object, a first liquid crystal light valve of the present invention includes:

- a pair of transparent substrates having transparent electrodes;
- a liquid crystal layer formed by sealing in liquid crystals between the transparent substrates;
- a photoconducting layer, formed on one of the transparent electrodes, for varying a voltage to be applied to the liquid crystal layer with a change in impedance according to an amount of light irradiated; and
- a dielectric mirror layer, located between the photoconducting layer and the liquid crystal layer, for reflecting light which has passed through the liquid crystal layer, the dielectric mirror layer having a plurality of dielectric films laminated, including a high packing density portion formed by at least one of the dielectric films, located on a liquid crystal side, and a low packing density portion with a packing density lower than a packing density of the high packing density portion, the low packing density portion being formed by the dielectric film other than the one used for the high packing density portion.

In the first liquid crystal light valve, since the packing density of the high packing density portion in the dielectric mirror layer is higher than the packing density of the low packing density portion, it is possible to prevent moisture absorption from the liquid crystal layer side and to lower the impedance of the overall dielectric mirror layer. Consequently, the dielectric mirror layer has a lower impedance than a dielectric mirror layer whose dielectric films are all formed by films with a high packing density for preventing absorption of unwanted moisture from the liquid crystal layer side. Additionally, the dielectric mirror layer has improved moisture resistance compared to a dielectric mirror layer whose dielectric films are all formed by films with a low packing density.

The dielectric mirror layer thus shows less changes in the optical characteristic and impedance with time. Therefore, a liquid crystal light valve having the dielectric mirror layer achieves improved photosensitivity and contrast of the image, and a lower drive voltage. It is even possible to prevent a lowering of the reliability of liquid crystal due to moisture absorption in the dielectric mirror layer. Moreover, since the optical characteristic and impedance are stabilized, the disparity in the liquid crystal light valve products is reduced. As a result, the quality is stabilized and the yield is increased.

It is therefore possible to improve the optical characteristic and manufacturing efficiency of the liquid crystal light valve.

In order to achieve the above object, a second liquid crystal light valve of the present invention includes:

- a pair of transparent substrates having transparent electrodes;
- a liquid crystal layer formed by sealing in liquid crystals between the transparent substrates;
- a photoconducting layer, formed on one of the transparent electrodes, for varying a voltage to be applied to the liquid crystal layer with a change in an impedance according to an amount of light irradiated; and
- a dense dielectric mirror layer, located between the photoconducting layer and the liquid crystal layer, for reflecting light which has passed through the liquid crystal layer, the dielectric mirror layer having a plurality of dielectric films laminated, the dielectric mirror layer being formed by an oxide semiconductor whose conductivity $\sigma$ is $0<\sigma \leq 1\times10^{-7}$ S/cm.

In the second liquid crystal light valve, since the dielectric mirror layer is formed by an oxide semiconductor whose conductivity $\sigma$ is $0<\sigma 1\times10^{-7}$ S/cm, the impedance is lowered. Moreover, since the dielectric mirror layer is a dense film, it shows less changes with time.

Consequently, a liquid crystal light valve having the dielectric mirror layer achieves improved photosensitivity and contrast of the image, and a lower drive voltage. Since the optical characteristic and impedance are stabilized, the disparity in the liquid crystal light valve products is reduced. As a result, the quality is stabilized and the yield is increased.

The dielectric mirror layer in the second liquid crystal light valve desirably includes a high packing density portion formed by at least one layer of the dielectric films on the liquid crystal side and a low packing density portion with a packing density lower than that of the high packing density portion, the low packing density portion being formed by the dielectric film other than the one used for the high packing density portion.

This structure provides a dielectric mirror layer which has a lower impedance and shows less changes with time.

In order to achieve the above object, a third liquid crystal light valve of the present invention includes:

- a pair of transparent substrates having transparent electrodes;
- a liquid crystal layer formed by sealing in liquid crystals between the transparent substrates;
- a photoconducting layer, formed on one of the transparent electrodes, for varying a voltage to be applied to the liquid crystal layer with a change in an impedance according to an amount of light irradiated; and
- a dense dielectric mirror layer, located between the photoconducting layer and the liquid crystal layer, for reflecting light which has passed through the liquid crystal layer, the dielectric mirror layer having a plurality of dielectric films laminated, the dielectric films containing a conducting material, a semiconducting material, a ferroelectric material, or a mixture thereof.

In the third liquid crystal light valve, since the dielectric film contains the conducting material, the semiconducting material, the ferroelectric material, or the mixture thereof, the dielectric mirror layer has a low impedance. Moreover, since the dielectric mirror layer is a dense film, it shows less changes with time. Thus, a liquid crystal light valve having such a dielectric mirror layer achieves improved photosensitivity and contrast of the image, and a lower drive voltage. Since the optical characteristic and impedance are stabilized, the disparity in the liquid crystal light valve products is reduced. As a result, the quality is stabilized and the yield is increased.

The dielectric mirror layer in the third liquid crystal light valve preferably includes a high packing density portion formed by at least one layer of the dielectric films on the liquid crystal side and a low packing density portion with a packing density lower than that of the high packing density portion, the low packing density portion being formed by the dielectric film other than the one used for the high packing density portion.

This structure provides a dielectric mirror layer which has a lower impedance and shows less changes with time.

For a fuller understanding of the nature and advantages of the invention, reference should be made to the ensuing detailed description taken in conjunction with the accompanying drawings.

DESCRIPTION OF THE PREFERRED EMBODIMENTS

[Embodiment 1]

Figure 1:
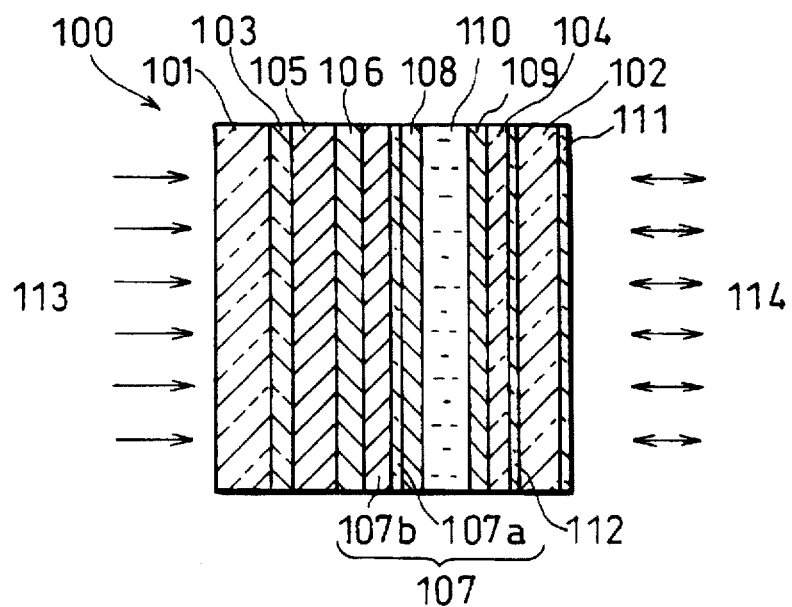
FIG. 1 is a sectional view showing a schematic structure of a liquid crystal light valve according to a first embodiment of the present invention.
Figure 2:
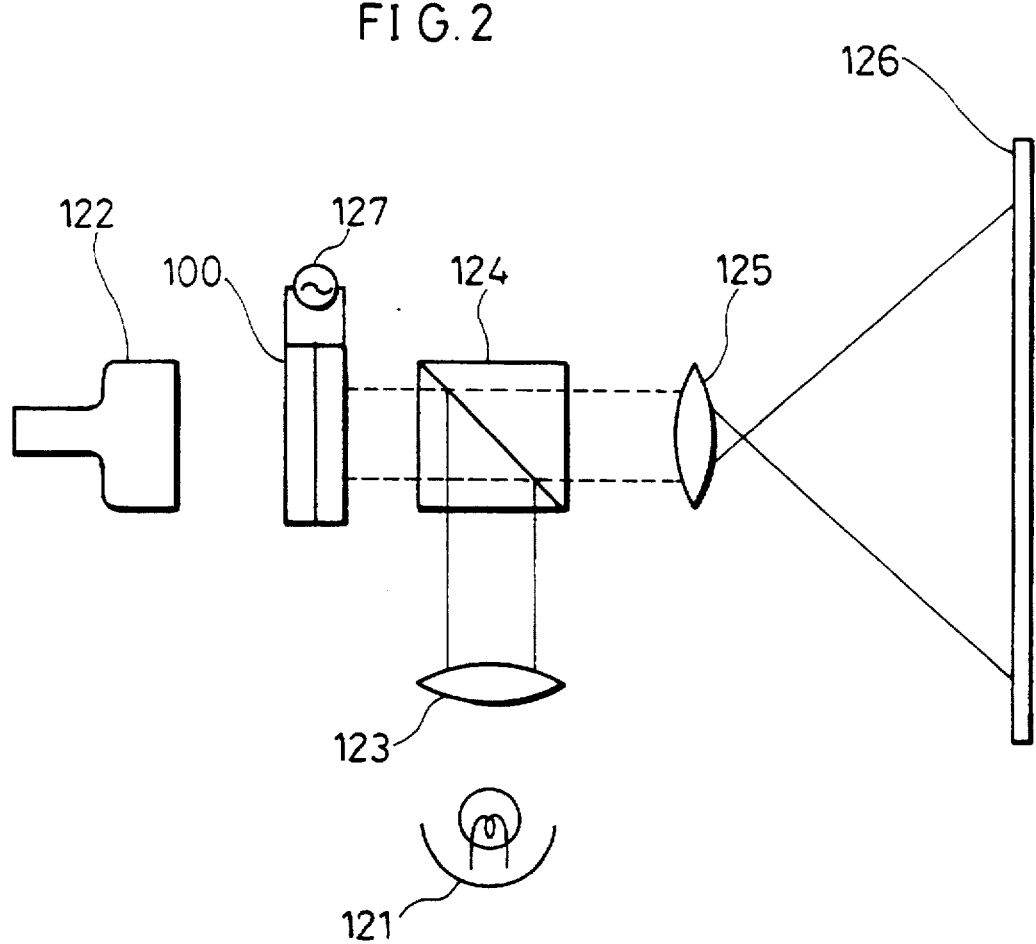
FIG. 2 is a view showing the structure of a projection-type liquid crystal display device including the liquid crystal valve of FIG. 1.
Figure 3:
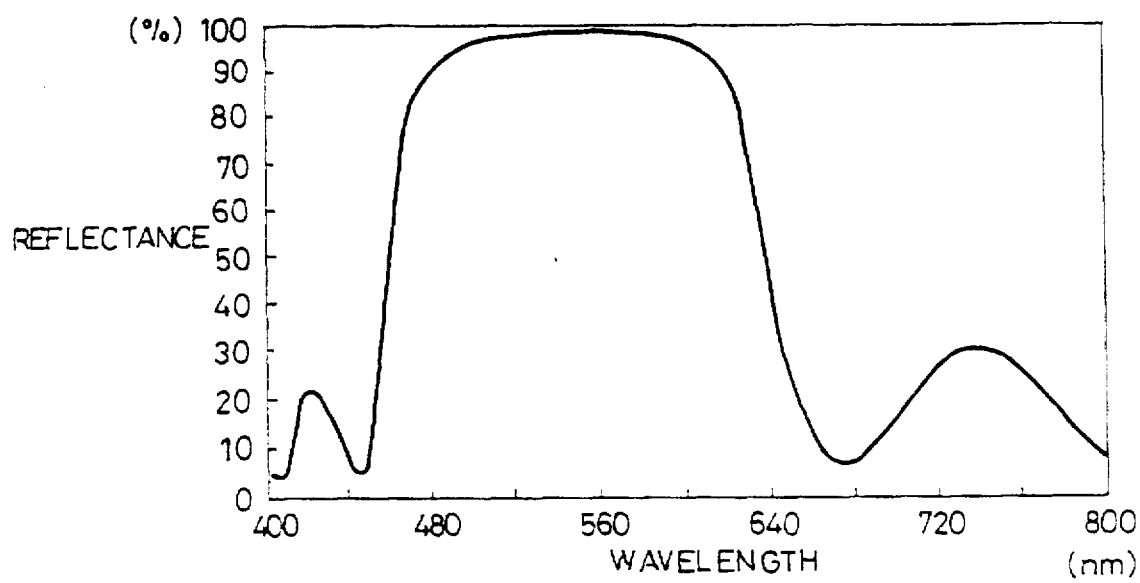
FIG. 3 is a graph showing the reflectance of a dielectric mirror layer of the liquid crystal light valve of FIG. 1.

The following description discusses a first embodiment of the present invention with reference to FIGS. 1 to 3.

As illustrated in FIG. 1, a liquid crystal light valve 100 of this embodiment is constructed by forming a transparent electrode 104 and an alignment film 109 in this order on a surface of a transparent substrate 102, forming a transparent electrode 103, a photoconducting layer 105, a light blocking layer 106, a dielectric mirror layer 107 and an alignment film 108 in this order on a transparent substrate 101, and sealing in a liquid crystal layer 110 between the transparent substrates 102 and 101.

Write light 113 for writing an image is incident on the transparent substrate 101. Read light 114 for reading out an image formed on the liquid crystal layer 110 is incident on the transparent substrate 102. Formed on both surfaces of the transparent substrate 102 are reflection reducing films 111 and 112 for preventing unnecessary reflection of the incident light. Similarly, reflection reducing films are formed on the transparent substrate 101, if necessary.

The dielectric mirror layer 107 includes a high packing density portion 107a on the side nearer to the liquid crystal layer 110, and a low packing density portion 107b on the side next to the light blocking layer 106. The high packing density portion 107a placed on the side nearer to the liquid crystal layer 110 is formed by at least one layer of dielectric film. On the other hand, the lower packing density portion 107b placed on the side next to the light blocking layer 106 is formed by a dielectric film other then the one used for the high packing density portion 107a so that its packing density is lower than the packing density of the high packing density portion 107a. The detail explanation of the dielectric mirror layer 107 will be given later.

In liquid crystal light valve 100 having the above-mentioned structure, the photoconducting layer 105 has a high impedance in a state (dark state) in which no image signal is input by the write light 113. The photoconducting layer 105 has a low impedance in a state (bright state) in which an image signal is input by photoconducting effects. In the low impedance state, a voltage applied to the liquid crystal layer 110 exceeds a threshold voltage, and the orientation of the liquid crystal layer 110 changes. When the read light 114 is irradiated on the liquid crystal layer 110, the change in the orientation is read out as a light intensity change and projected as an image onto a screen through a polarization beam splitter.

The following description explains a method for manufacturing the liquid crystal light valve 100 having the above-mentioned structure.

First, a transparent electrode 103 is formed by a transparent conducting film made by an oxide (ITO) of tin (Sn) and indium (In), and a tin oxide ($SnO_2$) transparent conducting film on the transparent substrate 101 by sputtering. Next, the photoconducting layer 105 is formed by amorphous silicon hydride (a-Si:H) on the transparent electrode 103. The photoconducting layer 105 is produced to have a film thickness of 6μ using a silane ($SiH_4$) gas and a hydrogen ($H_2$) gas as raw materials by a plasma CVD.

Additionally, the light blocking layer 106 made by amorphous silicon germanium hydride (a-SiGe:H) is formed on the photoconducting layer 105 using a silane ($SiH_4$) gas and germanium gas ($GeH_4$) as raw materials.

Furthermore, the dielectric mirror layer 107 is formed on the light blocking layer 106. The dielectric mirror layer 107 has a thirty-layer structure in which a film of a low refractive index material with an optical film thickness of $\lambda/4$ (=nd) and a film of a high refractive index material with the same optical film thickness are alternately laminated in 30 layers. Here, $\lambda$, n, and d represent a center wavelength of a reflection band of the dielectric mirror layer 107, a refractive index, and a physical film thickness, respectively.

In this embodiment, silicon dioxide ($SiO_2$) was used as the low refractive index material, and titanium dioxide ($TiO_2$) was used as the high refractive index material. The dielectric mirror layer 107 was deposited by electron-beam evaporation (EB evaporation). As to normal conditions, the deposition rate of $TiO_2$ is 5 to 10 angstroms per second, the deposition rate of $SiO_2$ is 10 to 20 angstroms per second, and a substrate temperature is between 300° C. and 350° C.

In general, the packing density of film is increased as the deposition rate is decreased, and the film becomes porous with a decrease in the substrate temperature. A porous film whose packing density is not higher than 0.9 was formed as the low packing density portion 107b by setting the substrate temperature, the deposition rate of TiO$_2$, and the deposition rate of SiO$_2$ at 200° C. 11 angstroms per second, and 22 angstroms per second, respectively. A film whose packing density is not lower than 0.9 was deposited as the high packing density portion 107a by using a lower deposition rate than the deposition rate of the low packing density portion 107b and raising the substrate temperature to 300° C. These settings provide the dielectric mirror layer 107 in which the packing density of the high packing density portion 107a is higher than the packing density of the low packing density portion 107b. Here, the packing density is a ratio of a substantial film portion to the entire film volume containing voids.

The high packing density portion 107a may be a low refractive index material or a high refractive index material depending on the film structure. Denoting the low refractive index material having an optical film thickness of $\lambda/4$ and the high refractive index material having an optical film thickness of $\lambda/4$ as L and H, respectively, $[LH]^{15}$, which is formed by alternately laminating L and H of the same film thickness 15 times, has 30 layers. In this case, the outermost layer is a film of TiO$_2$ deposited at a deposition rate of 1 angstrom per second.

$[(L/2)H(L/2)]^{15}$, which is formed by laminating 15 times a structure in which H is sandwiched between two L/2 films whose thickness is a half of L, has 31 layers. In this case, the outermost layer is a film of SiO$_2$ deposited at a deposition rate of 3 angstroms per second. In either case, the packing density of the outermost layer (the high packing density portion 107a) was not lower than 0.9.

After the formation of the dielectric mirror layer 107, the alignment films 108 and 109 are formed on the facing surfaces of the transparent substrate 101 and 102 by spin-coating polyimides. The alignment films 108 and 10 are then subjected to rubbing processing.

Substrate sections including the two pieces of transparent substrates 101 and 102 on which the above-mentioned layers have been formed are placed so that the alignment films 108 and 109 face each other, and bonded together through a spacer (not shown). Thereafter, liquid crystals are injected between the alignment films 108 and 109 to form the liquid crystal layer 110.

A dielectric mirror layer was formed as a comparative example under normal conditions, i.e., the deposition rate of TiO$_2$ was 7 angstroms per second, the deposition rate of SiO$_2$ was 15 angstroms per second, and the substrate temperature was 300° C. Changes in the optical characteristic of the dielectric mirror layer 107 and the comparative dielectric mirror layer and in the impedance at a frequency of 600 Hz were observed with time. The results are shown in Table 1.

TABLE 1

|  | Comparable Example | Embodiment 1 |
| --- | --- | --- |
| Center wavelength (nm) just after formation | 550.4 | 550.2 |
| Center wavelength (nm) after 10 days | 560.6 | 557.3 |
| Impedance (Ω) just after formation | 1.2E + 05 | 7.4E + 04 |
| Impedance (Ω) after leaving 10 days | 4.8E + 04 | 4.2E + 04 |
| Drop rate (%) | 60.0 | 43.2 |

Table 1 shows the results just after the formation of mirror and the results after leaving the mirror in the atmosphere for 10 days. Changes in the optical characteristic indicate changes in the center wavelength of a band where the spectral reflectance characteristic of the dielectric mirror shown in FIG. 3 is not lower than 90%. The impedance is a value when the area of the dielectric mirror layer is 1 cm$^2$. The drop rate is an index representing an amount of change in the impedance, and given by $$\text{drop rate } (\%) = (1 - Z_{10}/Z_0) \times 100 \quad (1)$$

where $Z_0$ is the impedance just after the formation, and $Z_{10}$ is the impedance after leaving the mirror for 10 days. A drop rate of 0% means that no changes were observed.

In this embodiment, by increasing the substrate temperature and decreasing the deposition rate in forming the outermost layer of the dielectric mirror layer 107, the outermost layer had a dense film quality with a packing density of not lower than 0.9. As a result, the amounts of changes in the optical characteristic and in the impedance of the dielectric mirror layer 107 caused by moisture absorption were significantly reduced. Moreover, the impedance of the dielectric mirror layer 107 of this embodiment was lower than that of the comparative dielectric mirror layer.

Therefore, the voltage to be applied to the dielectric mirror layer 107 when driving the liquid crystal light valve 100 is lowered. Consequently, the voltage difference in the liquid crystal layer 110 due to changes in the impedance caused by irradiating light or stopping irradiation is increased, thereby improving the photosensitivity of the liquid crystal light valve 100 and the contrast of the image. Similarly, the drive voltage of the liquid crystal light valve 100 is also lowered.

Since the packing density of the high packing density portion 107a as the outermost layer was not lower than 0.9 and the other layers were formed by the low packing density portion 107b, the resulting dielectric mirror had a low impedance and showed less changes in the optical characteristic and impedance characteristic with time due to moisture absorption.

As illustrated in FIG. 2, a projection-type liquid crystal display device using the liquid crystal valve 100 of the above-mentioned structure includes a CRT (cathode ray tube) 122 as image forming means. The CRT 122 writes an image on the liquid crystal light valve 100 with an irradiation of write light corresponding to the image.

Moreover, the projection-type liquid crystal display device includes a read lamp 121 as a read light source. Light emitted by the read lamp 121 is incident on a polarization beam splitter 124 through a lens 123. The light is individually modulated depending on the intensity of the write light source. Each of the images thus read out is synthesized and enlarged by the polarization beam splitter 124 and a lens 125, and projected onto a screen 126.

Referring now to FIGS. 1 and 2, the following description explains the state of the liquid crystal light valve 100 when the write light from the CRT 122 is incident on the transparent substrate 101.

In a region exposed to the light (the bright state), since the impedance of the photoconducting layer 105 is lowered, the voltage from an AC power source 127 is applied to the liquid crystal layer 110. On the other hand, in a region which is not exposed to the light (the dark state), since the impedance of the photoconducting layer 105 does not change, only a voltage which is not higher than a threshold voltage of liquid crystal is applied. An image is formed on the liquid crystal valve 100 by the difference between the bright state and the dark state.

Only an S-polarized light component of the read light from the lamp 121 is incident on the liquid crystal light valve 100 on which the image has been formed through the lens 123 and the polarization beam splitter 124. The incident light is reflected by the dielectric mirror layer 107 which functions as the light reflecting layer, modulated by the liquid crystal layer 110 so that it becomes P-polarized light in the region in the bright state, passes through the polarization beam splitter 124, and is displayed as a white portion of the image. On the other hand, in a region in the dark state, since the incident light is not modulated by the liquid crystal layer 110, it does not pass through the polarization beam splitter 124. Therefore, a portion which does not pass the S-polarized light is displayed as a black portion of the image. Then, the light which has passed through the polarization beam splitter 124, i.e., the image formed on the liquid crystal light valve 100 is enlarged by the lens 125, and projected onto the screen 126.

If the dielectric mirror layer 107 is employed, the photosensitivity and the contrast of the image are improved, thereby providing the liquid crystal light valve 100 with a low drive voltage.

Moreover, when forming the dielectric mirror layer 107, a film with a high packing density is used for the high packing density portion 107a as the outermost layer, and the low packing density portion 107b is controlled to have a lower packing density. This arrangement prevents a lowering of the reliability of liquid crystal due to moisture absorption in the dielectric mirror layer 107. Therefore, the optical characteristic and impedance of the liquid crystal light valve 100 are stabilized, and the disparity in the characteristics of the products is decreased. As a result, the quality is stabilized, and the yield is increased.

Furthermore, with the use of the dielectric mirror layer 107 of this embodiment, since sufficient brightness and resolution are obtained with a reduced amount of write light, it is possible to provide a highly bright high-resolution projection-type liquid crystal display device.

In this embodiment, although the substrate temperature and the deposition rate are varied between the high packing density portion 107a as the outermost layer and the low packing density portion 107b as the other layers when producing the dielectric mirror layer 107, it is also possible to change the packing density by only changing one of the parameters.

Additionally, in the liquid crystal valve 100 of this embodiment, only one layer of the dielectric mirror 107, i.e., the high packing density portion 107a (dielectric film) as the outermost layer of the dielectric mirror layer 107 is a dense film with a high packing density. However, the dense film may be several layers of dielectric films in the high packing density portion 107a. The above-mentioned effects can also be produced with this structure.

Furthermore, in this embodiment, $TiO_2$ and $SiO_2$ were used as the high refractive index material and the low refractive index material forming the dielectric mirror layer 107, respectively. However, the present invention is not necessarily limited by these materials. Examples of the high refractive index material are cerium fluoride ($CeF_3$), aluminum oxide ($Al_2O_3$), magnesium oxide (MgO), hafnium oxide ($HfO_2$), silicon nitride ($Si_3N_4$), zirconium oxide ($ZrO_2$), antimony oxide ($Sb_2O_3$), tantalum pentoxide ($Ta_2O_5$), cerium oxide ($CeO_2$) and so on. Examples of the low refractive index material are barium fluoride ($BaF_2$), sodium fluoride (NaF), magnesium fluoride ($MgF_2$), aluminum fluoride ($AlF_3$), calcium fluoride ($CaF_2$), and strontium fluoride ($SrF_2$).

[Embodiment 2]

Figure 4:
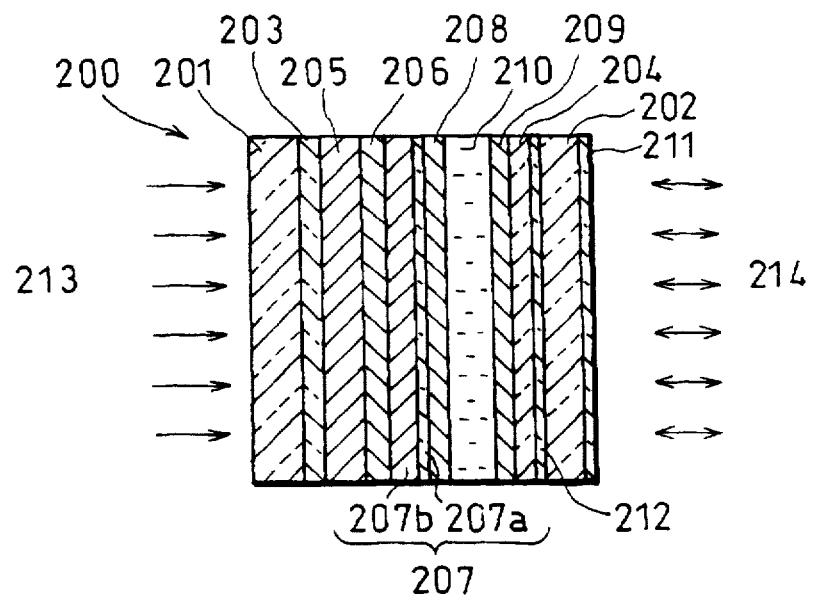
FIG. 4 is a sectional view showing a schematic structure of a liquid crystal light valve according to a second embodiment of the present invention.
Figure 5:
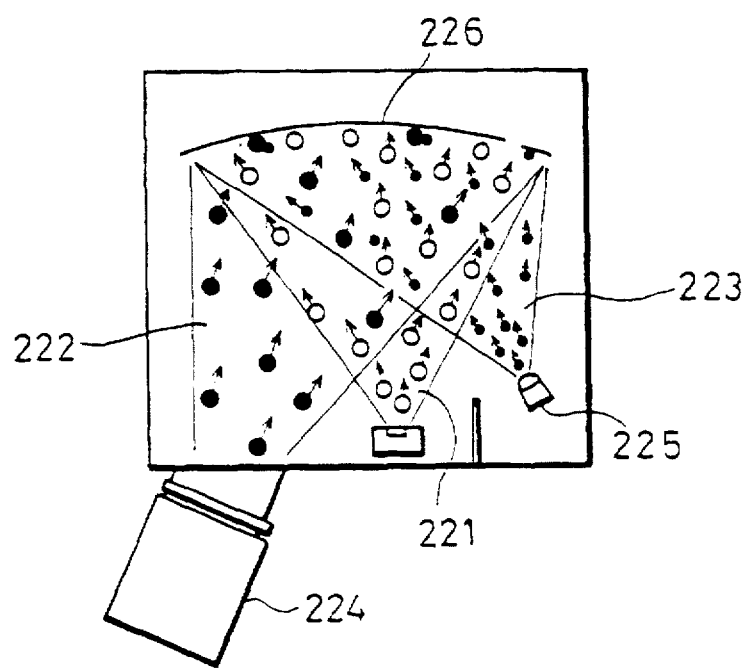
FIG. 5 is an explanatory view showing a method for manufacturing a dielectric mirror layer of the liquid crystal light valve of FIG. 4.
Figure 6:
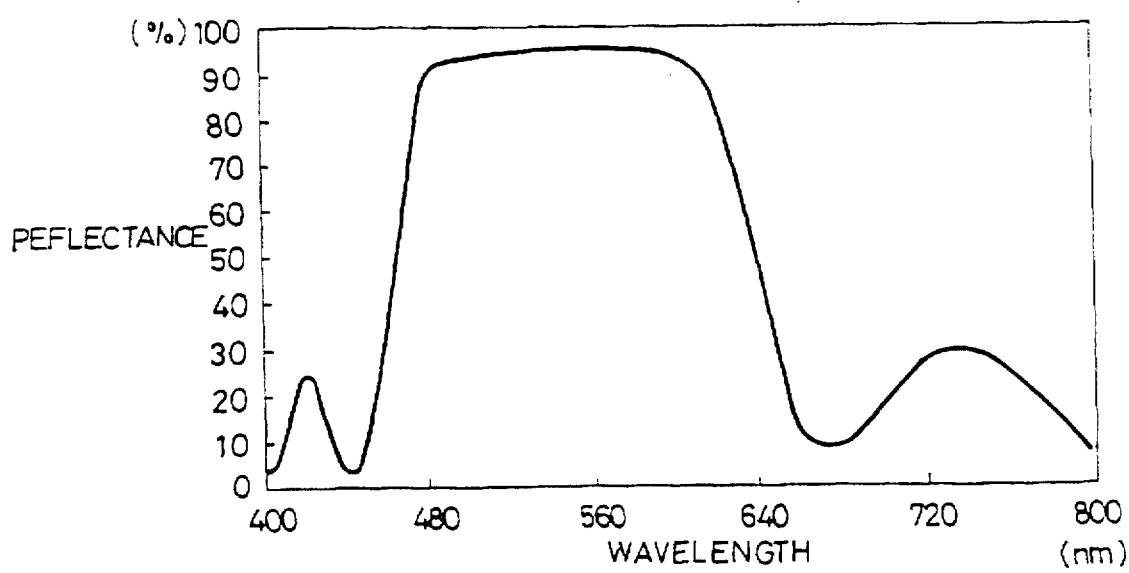
FIG. 6 is a graph showing the reflectance of the dielectric mirror layer of the liquid crystal light valve of FIG. 4.

The following description discusses a second embodiment of the present invention with reference to FIGS. 4 to 6.

As illustrated in FIG. 4, a liquid crystal light valve 200 of this embodiment is constructed by forming a transparent electrode 204 and an alignment film 209 in this order on a surface of a transparent substrate 202, forming a transparent electrode 203, a photoconducting layer 205, a light blocking layer 206, a dielectric mirror layer 207 and an alignment film 208 in this order on a transparent substrate 201, and sealing in a liquid crystal layer 210 between the transparent substrates 202 and 201.

Write light 213 for writing an image is incident on the transparent substrate 201. Read light 214 for reading out an image formed on the liquid crystal layer 210 is incident on the transparent substrate 202. Formed on both surfaces of the transparent substrate 202 are reflection reducing films 211 and 212 for preventing unnecessary reflection of the incident light. Similarly, reflection reducing films are formed on the transparent substrate 201, if necessary.

The dielectric mirror layer 207 includes a high packing density portion 207a on a side nearer to the liquid crystal layer 210, and a low packing density portion 207b on a side next to the light blocking layer 206. The dielectric mirror layer 207 will be explained in detail later.

The following description explains a method for manufacturing the liquid crystal light valve 200 having the above-mentioned structure.

First, the transparent electrode 203 is formed by a transparent conducting film of zinc oxide (ZnO) on the transparent substrate 201 by sputtering. Then, a photoconducting layer 205 is formed by bismuth silicate ($Bi_{12}SiO_{20}$, abbreviated to BSO) on the transparent electrode 203. The photoconducting layer 205 of BSO is formed to have a film thickness of 10μ using a sputtering target of bismuth (Bi) and silicon (Si) by electron cyclotron resonance sputtering (ECR-SP). Additionally, the light blocking layer 206 is formed on the photoconducting layer 205 by an acrylic resin containing dispersed carbon black as an organic pigment.

Next, the dielectric mirror layer 207 is formed on the light blocking layer 206 by electron-beam evaporation. The dielectric mirror layer 207 includes a high packing density portion 207a as the outermost layer on a side nearer to the liquid crystal layer 210, and a low packing density portion 207b on a side next to the light blocking layer 206. The dielectric mirror layer 207 has a twenty-layer structure in which a film of a low refractive index material with an optical film thickness of λ/4 and a film of a high refractive index material with the same optical film thickness are alternately laminated in 20 layers. $SiO_2$ was used as the low refractive index material, and tantalum pentoxide ($Ta_2O_5$) was used as the high refractive index material. As to normal conditions for EB evaporation, the deposition rate of $Ta_2O_5$ is 5 to 10 angstroms per second, the deposition rate of $SiO_2$ is 10 to 20 angstroms per second, and the substrate temperature is between 300° C. and 350° C.

As described above, the film becomes dense with a decrease in the deposition rate, and the film becomes porous with a decrease in the substrate temperature. A porous film was deposited as the low packing density portion 207b by setting the substrate temperature at 200° C., the deposition rate of $Ta_2O$ at 12 angstroms per second, and the deposition rate of $SiO_2$ at 23 angstroms per second. A film with a high packing density was formed as the high packing density portion 207a using ion-beam assisted deposition (IAD) at a substrate temperature of 300° C.

The following description discusses IAD with reference to FIG. 5. As illustrated in FIG. 5, IAD is carried out by a device including an ion beam source 224 for irradiating an ion beam 222 and a neutralizer 225 for generating a neutralizing electron beam 223. The neutralizing electron beam 223 is used so as to prevent the charges on the substrate 226 caused by the ion beam 222 from obstructing the film formation.

IAD is a deposition method in which the ion beam 222 and the neutralizing electron beam 223 are simultaneously irradiated while performing EB evaporation using an electron beam 221. Specifically, by performing deposition while irradiating the ion beam 222 generated by the ion beam source 224 on the film 226, chemical bonding of deposited particles due to direct energy imparting to particles on the outer surface is assisted, and a dense film is formed.

The high packing density portion 207a as the outermost layer may be a low refractive index material or a high refractive index material depending on the film structure. Denoting the low refractive index material having an optical film thickness of $\lambda/4$ and the high refractive index material having an optical film thickness of $\lambda/4$ as L and H, respectively, $[LH]^{10}$, which is formed by alternately laminating L and H of the same film thickness 10 times, has 20 layers. In this case, the outermost layer is a film of $Ta_2O_5$ deposited at a deposition rate of 1 angstrom per second. $[(L/2)H(L/2)]^{10}$, which is formed by laminating 10 times a structure in which H is sandwiched between two L/2 films whose film thickness is a half of L, has 21 layers. In this case, the outermost layer is a film of $SiO_2$, deposited at a deposition rate of 3 angstroms per second. In either case, the packing density of the high packing density portion 207a was not lower than 0.9.

After the formation of the dielectric mirror layer 207, the alignment films 208 and 209 are formed on the transparent substrates 201 and 202, respectively, by a printing method for polyimides. The alignment films 208 and 209 are then subjected to rubbing processing. Next, substrate sections produced by the two pieces of substrates 201 and 202 are bonded, and liquid crystals are implanted between the alignment films 208 and 209 so as to form the liquid crystal layer 210.

A dielectric mirror layer was formed as a comparative example under normal conditions, i.e., the deposition rate of $Ta_2O_5$ was 7 angstroms per second, the deposition rate of $SiO_2$ was 15 angstroms per second, and the substrate temperature was 300° C. Changes in the optical characteristic of the dielectric mirror layer 207 and the comparative dielectric mirror layer and changes in the impedance at a frequency of 600 Hz were observed with time. The results are shown in Table 2.

TABLE 2

|  | Comparable Example | Embodiment 2 |
| --- | --- | --- |
| Center wavelength (nm) just after formation | 549.8 | 550.1 |
| Center wavelength (nm) after 10 days | 560.1 | 556.7 |
| Impedance (Ω) just after formation | 8.2E + 04 | 4.7E + 04 |
| Impedance (Ω) after leaving 10 days | 3.3E + 04 | 2.8E + 04 |
| Drop rate (%) | 59.8 | 40.4 |

Table 2 shows the results just after the formation of mirror and the results after leaving the mirror in the atmosphere for 10 days. Changes in the optical characteristic indicate changes in the wavelength at the center of a band where the spectral reflectance characteristic of the dielectric mirror shown in FIG. 6 is not lower than 90%. The impedance is a value when the area of the dielectric mirror layer is 1 cm². The drop rate is given by equation (1) above.

In this embodiment, with the use of IAD, the outermost layer had a dense film quality with a packing density not lower than 0.9, and the other layers had a low packing density. As a result, the amounts of changes in the optical characteristic and in the impedance of the dielectric mirror layer caused by moisture absorption were significantly reduced. Moreover, the impedance of the dielectric mirror layer 207 of this embodiment was lower than that of the comparative dielectric mirror layer.

Therefore, the voltage to be applied to the dielectric mirror layer 207 when driving the liquid crystal light valve 200 is lowered. Consequently, the voltage difference in the liquid crystal layer 210 due to changes in the impedance caused by irradiating light or stopping irradiation is increased, thereby improving the photosensitivity and the contrast of the image. Similarly, the drive voltage of the liquid crystal light valve 200 is also lowered.

This arrangement prevents a lowering of the reliability of liquid crystal due to moisture absorption in the dielectric mirror layer 207. Thus, the optical characteristic and impedance of the liquid crystal light valve 200 are stabilized, and the variation in the characteristic among the products is decreased. As a result, the quality is stabilized, and the yield is increased.

In this embodiment, although the substrate temperature, deposition rate and deposition method were varied between the high packing density portion 207a as the outermost layer and the low packing density portion 207b as the other layers when producing the dielectric mirror layer 207, it is also possible to change the packing density by changing only one of the parameters.

Additionally, in this embodiment, only one layer, i.e., the high packing density portion 207a as the outermost layer of the dielectric mirror layer 207 is a dense film with a high packing density. It is also possible to produce similar effects if several layers near the liquid crystal layer 210 are dense films.

Furthermore, in this embodiment, $Ta_2O_5$ and $SiO_2$ were used as the high refractive index material and the low refractive index materials, respectively. However, the present invention is not necessarily limited by these materials. Examples of the high refractive index material are $CeF_3$, $Al_2O_3$, $MgO$, $HfO_2$, $Si_3N_4$, $ZrO_2$, $Sb_2O_3$, $TiO_2$, and $CeO_2$. Examples of the low refractive index material are $BaF_2$, $NaF$, $MgF_2$, $AlF_3$, $CaF_2$, and $SrF_2$.

Although IAD was used as a method for forming the dielectric mirror layer 207 in this embodiment, it is also possible to use an ion plating method or an ECR ion beam assisted method.

[Embodiment 3]

Figure 7:
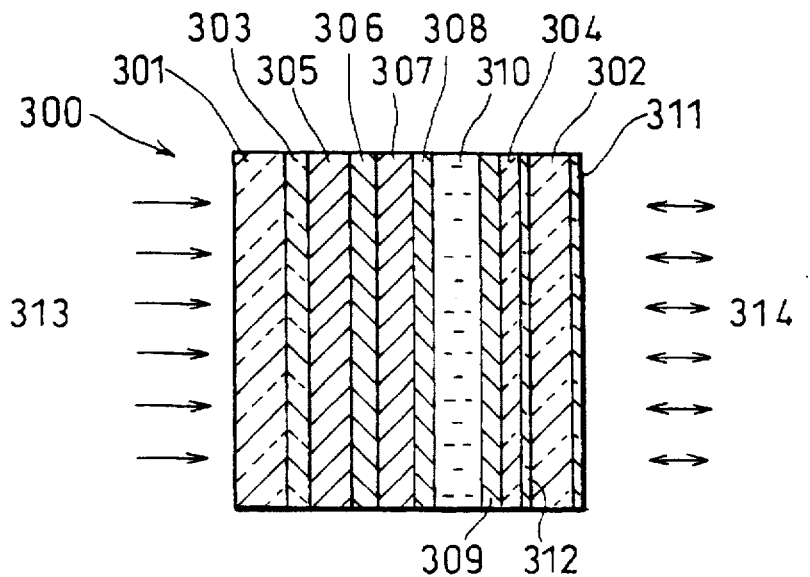
FIG. 7 is a sectional view showing a schematic structure of a liquid crystal light valve according to a third embodiment of the present invention.
Figure 8:
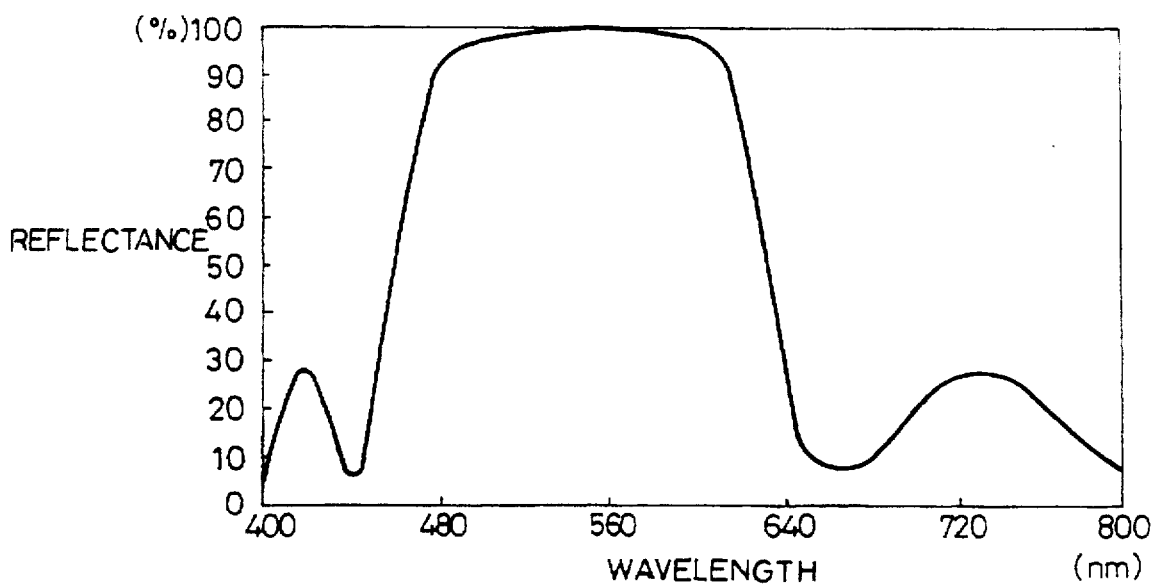
FIG. 8 is a graph showing the reflectance of a dielectric mirror layer of the liquid crystal light valve of FIG. 7.

The following description discusses a third embodiment of the present invention with reference to FIGS. 7 and 8.

As illustrated in FIG. 7, a liquid crystal light valve 300 of this embodiment is constructed by forming a transparent electrode 304 and an alignment film 309 in this order on a surface of a transparent substrate 302, forming a transparent electrode 303, a photoconducting layer 305, a light blocking layer 306, a dielectric mirror layer 307 and an alignment film 308 in this order on a transparent substrate 301, and sealing in a liquid crystal layer 310 between the transparent substrates 302 and 301.

Write light 313 for writing an image is incident on the transparent substrate 301. Read light 314 for reading out an image formed on the liquid crystal layer 310 is incident on the transparent substrate 302. Formed on both surfaces of the transparent substrate 302 are reflection reducing films 311 and 312 for preventing unnecessary reflection of the incident light. Similarly, reflection reducing films are formed on the transparent substrate 301, if necessary.

The following description explains a method for manufacturing the liquid crystal light valve 300 having the above-mentioned structure.

First, a transparent electrode 303 is formed by an ITO transparent conducting film on the transparent substrate 301 by sputtering. Then, a photoconducting layer 305 is formed by cadmium sulfide (CdS) on the transparent electrode 303. The photoconducting layer 305 made from CdS is formed so as to have a film thickness of 9μ using a sputtering target of CdS by a magnetron sputtering method. Additionally, the light blocking layer 306 is formed by semiconducting superfine-particle-dispersed glass on the photoconducting layer 305. The semiconducting super-fine-particle-dispersed glass is formed by dispersing semiconducting super fine particles of cadmium telluride (CdTe) in $SiO_2$.

Next, the dielectric mirror layer 307 is formed on the light blocking layer 306. The dielectric mirror layer 307 has a multi-layer structure in which a film of a low refractive index material with an optical film thickness of λ/4 and a film of a high refractive index material with the same optical film thickness are alternately laminated in 10 layers. The producing conditions of the dielectric mirror layer 307 of this embodiment are as follows.

$SiO_2$ is used as the low refractive index material, and indium oxide ($In_2O_3$) is used as the high refractive index material. Sputtering is employed for the formation of the dielectric mirror layer 307. Since $In_2O_8$ is an oxide semiconductor and transparent, it is usually used as a transparent conducting film called an ITO by doping Sn.

If the resistance of the dielectric mirror layer 307 is too low, the applied voltage spreads in the surface direction of the dielectric mirror layer 307, thereby lowering the resolution of the liquid crystal light valve 300. In order to prevent the lowering of resolution, it is necessary to set the conductivity σ of $In_2O_3$ within a range $1\times10^{-14} < \sigma \leq 1\times10^{-7}$ S/cm so that the upper limit is $1\times10^{-7}$ S/cm and the lower limit is $1\times10^{-14}$ S/cm that is equal to the conductivity of an insulator. Moreover, in order to set the resolution of the liquid crystal light valve 300 and the impedance of the dielectric mirror layer 307 to appropriate values, it is desirable to set the conductivity σ a within a range $1\times10^{-9} \leq \sigma \leq 1\times10^{-7}$ S/cm.

Furthermore, it is also possible to produce a film with low impedance and high resistance by adjusting the conditions as follows. In this embodiment, the optimum conditions for achieving a high resistance were found, and the ITO film was produced under the conditions and used as a high refractive index layer of the dielectric mirror layer 307. As to the conditions, the substrate temperature was set at room temperature, the deposition rate was set at 20 angstroms per second, and only Ar was introduced as a sputtering gas. Annealing was not performed after the ITO film formation. As a result, a film with a conductivity of $1\times10^8$ S/cm was obtained. In this case, the deposition rate of $SiO_2$ was 30 angstroms per second, and a film with a packing density not lower than 0.9 was formed.

After the formation of the dielectric mirror layer 307 on the transparent layer 301, the alignment films 308 and 309 are formed on the transparent substrates 301 and 302, respectively, by a printing method for polyimides. The alignment films 308 and 309 are then subjected to rubbing processing. Next, substrate sections produced by the two pieces of substrates 301 and 302 are bonded, and liquid crystals are injected between the alignment films 308 and 309 so as to form the liquid crystal layer 310.

A dielectric mirror layer was formed as a comparative example by alternately laminating $SiO_2$ and $TiO_2$ at deposition rates of 15 angstroms per second and 7 angstroms per second, respectively, at a substrate temperature of 300° C. with an EB device. Changes in the optical characteristic and the impedance of the dielectric mirror layer 307 and the comparative dielectric mirror layer were observed with time. The results are shown in Table 3.

TABLE 3

|  | Comparable Example | Embodiment 3 |
|---|---|---|
| Center wavelength (nm) just after formation | 550.0 | 550.1 |
| Center wavelength (nm) after 10 days | 560.3 | 553.5 |
| Impedance (Ω) just after formation | 4.1E + 04 | 1.0E + 04 |
| Impedance (Ω) after 10 days | 1.6E + 04 | 8.0E + 03 |
| Drop rate (%) | 61.0 | 20.0 |

Table 3 shows the results just after the formation of mirror and the results after leaving the mirror in the atmosphere for 10 days. Changes in the optical characteristic indicate changes in the wavelength at the center of a band where the spectral reflectance characteristic of the dielectric mirror shown in FIG. 8 is not lower than 90%. The impedance is a value at 600 Hz when the area of the dielectric mirror layer is 1 cm².

As described above, the film formed by sputtering had a higher packing density than a film formed by EB evaporation. It was thus possible to obtain dense film quality. Consequently, the changes in the optical characteristic and in the impedance of the dielectric mirror layer caused by moisture absorption were significantly reduced. Moreover, the impedance of the dielectric mirror layer 307 of this embodiment was lower than that of the comparative dielectric mirror layer.

Therefore, the voltage to be applied to the dielectric mirror layer 307 in driving the liquid crystal light valve 300 is lowered. Consequently, the voltage difference in the liquid crystal layer 310 due to changes in the impedance caused by irradiating light or stopping irradiation is increased, thereby improving the photosensitivity and the contrast of the image. Similarly, the drive voltage of the liquid crystal light valve 300 is also lowered.

This arrangement prevents a lowering of the reliability of liquid crystal due to moisture absorption in the dielectric mirror layer 307. Therefore, the optical characteristic and impedance of the liquid crystal light valve 300 are stabilized, and the disparity in the characteristics of the products is decreased. As a result, the quality is stabilized, and the yield is increased.

In this embodiment, only $In_2O_3$ was used for the dielectric mirror layer 307. However, this does not limit the present invention, and it is also possible to use oxide semiconductors, such as cadmium oxide (CdO), zinc oxide (ZnO), and $SnO_2$, for the dielectric mirror layer 307.

[Embodiment 4]

Figure 9:
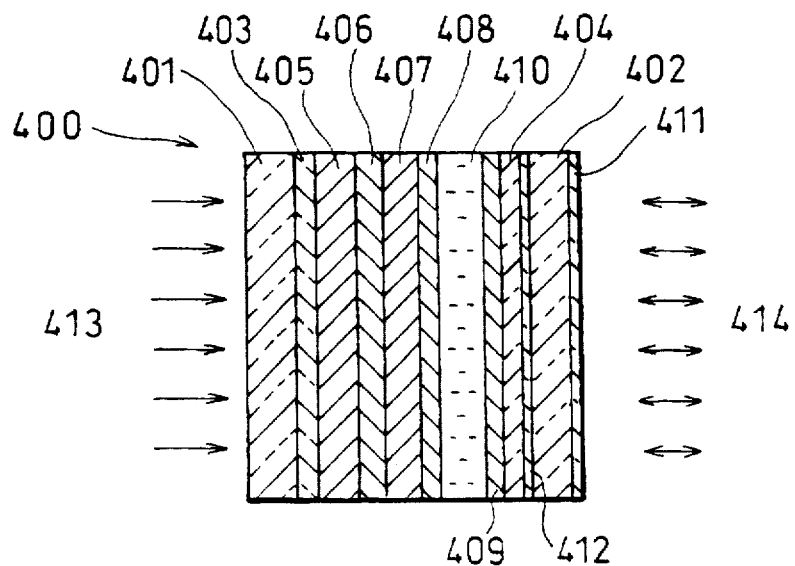
FIG. 9 is a sectional view showing a schematic structure of a liquid crystal light valve according to a fourth embodiment of the present invention.
Figure 10:
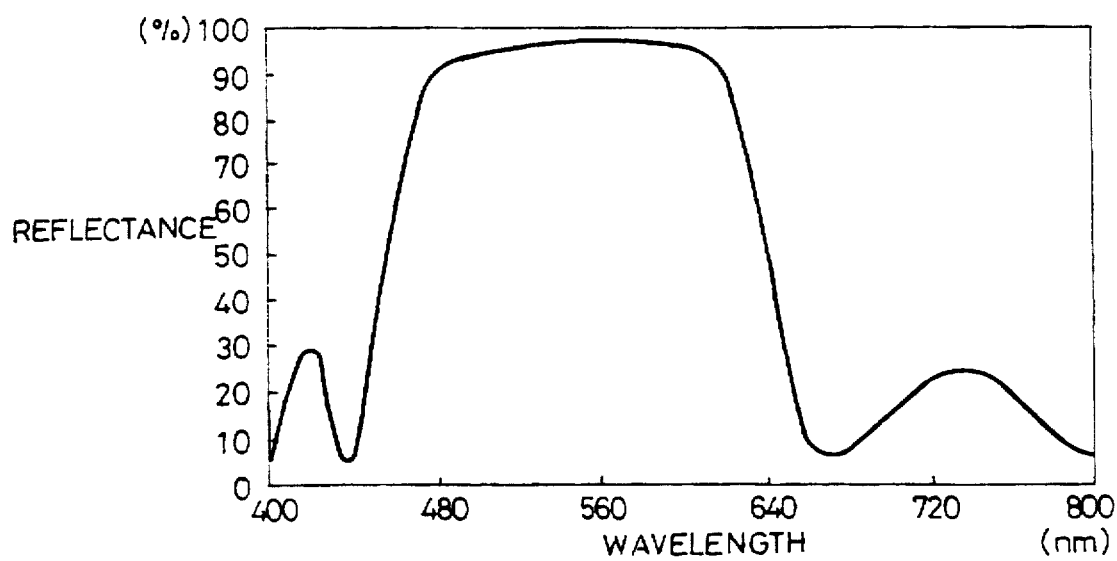
FIG. 10 is a graph showing the reflectance of a dielectric mirror layer of the liquid crystal light valve of FIG. 9.

The following description discusses a fourth embodiment of the present invention with reference to FIGS. 9 and 10.

As illustrated in FIG. 9, a liquid crystal light valve 400 of this embodiment is constructed by forming a transparent electrode 404 and an alignment film 409 in this order on a surface of a transparent substrate 402, forming a transparent electrode 403, a photoconducting layer 405, a light blocking layer 406, a dielectric mirror layer 407 and an alignment film 408 in this order on a transparent substrate 401, and sealing in a liquid crystal layer 410 between the transparent substrates 402 and 401.

Write light 413 for writing an image is incident on the transparent substrate 401. Read light 414 for reading out an image formed on the liquid crystal layer 410 is incident on the transparent substrate 402. Formed on both surfaces of the transparent substrate 402 are reflection reducing films 411 and 412 for preventing unnecessary reflection of the incident light. Similarly, reflection reducing films are formed on the transparent substrate 401, if necessary.

The following description explains a method for manufacturing the liquid crystal light valve 400 having the above-mentioned structure.

First, the transparent electrode 403 is formed by an ITO transparent conducting film and an $SnO_2$ transparent conducting film on the transparent substrate 401 by sputtering. Then, a photoconducting layer 405 is formed by amorphous silicon carbide hydride (a-SiC:H) on the transparent electrode 403. The photoconducting layer 405 is formed so as to have a film thickness of 8 μm using $SiH_4$, $H_2$ and a methane gas ($CH_4$) as raw materials by a plasma CVD method.

Next, the light blocking layer 406 is formed by CdTe on the photoconducting layer 405. Then, the dielectric mirror layer 407 is formed on the light blocking layer 406 by sputtering. The dielectric mirror layer 407 has a 24-layer structure in which a film of a low refractive index material with an optical film thickness of λ/4 and a film of a high refractive index material with the same optical film thickness are alternately laminated in 24 layers. The producing conditions of the dielectric mirror layer 407 of this embodiment are as follows.

$SiO_2$ was used as the low refractive index material, and $TiO_2$ containing a very small amount of gold (Au) was used as the high refractive index material. A target formed by $TiO_2$ and Au chips placed on $TiO_2$, was used for the production of the high refractive index layer, while a target formed by $SiO_2$ was used for the production of the low refractive index layer. Sputtering was performed using Ar as a sputtering gas at a substrate temperature of 200° C. A film with a packing density not lower than 0.9 was formed by setting the deposition rate of the high refractive index layer at 20 angstroms per second and the deposition rate of the low refractive index layer at 30 angstroms per second.

After the formation of the dielectric mirror layer 407 on the transparent layer 401, the alignment films 408 and 409 are formed on the transparent substrates 401 and 402, respectively, by a printing method for polyimides. The alignment films 408 and 409 are then subjected to rubbing processing. Next, substrate sections produced by the two pieces of substrates 401 and 402 are bonded, and liquid crystals are injected between the alignment films 408 and 409 so as to form the liquid crystal layer 410.

A dielectric mirror layer was formed as a comparative example by alternately laminating $SiO_2$ and $TiO_2$ at deposition rates of 15 angstroms per second and 7 angstroms per second, respectively, at a substrate temperature of 300° C. with the EB device. Changes in the optical characteristic and the impedance of the dielectric mirror layer 407 and the comparative dielectric mirror layer were observed with time. The results are shown in Table 4.

TABLE 4

|  | Comparable Example | Embodiment 4 |
|---|---|---|
| Center wavelength (nm) just after formation | 550.2 | 549.9 |
| Center wavelength (nm) after 10 days | 560.8 | 554.0 |
| Impedance (Ω) just after formation | 9.7E + 04 | 4.1E + 04 |
| Impedance (Ω) after 10 days | 3.5E + 04 | 3.3E + 04 |
| Drop rate (%) | 63.9 | 19.5 |

Table 4 shows the results just after the formation of mirror and the results after leaving the mirror in the atmosphere for 10 days. Changes in the optical characteristic indicate changes in the wavelength at the center of a band where the spectral reflectance characteristic of the dielectric mirror shown in FIG. 10 is not lower than 90%. The impedance is a value at 600 Hz when the area of the dielectric mirror layer is 1 $cm^2$.

As described above, the film formed by sputtering had a higher packing density than a film formed by EB evaporation. It was thus possible to have dense film quality. Consequently, the changes in the optical characteristic and in the impedance of the dielectric mirror layer 407 caused by moisture absorption were significantly reduced.

Moreover, the impedance of the dielectric mirror layer 407 of this embodiment was lower than that of the comparative dielectric mirror layer. The reason for this is that, by dispersing a very small amount of metal in a dielectric material of the high refractive index layer, the conductivity of the high refractive index layer becomes higher than that of the dielectric mirror layer of the comparative example. Consequently, the amount of resistant component in the impedance is reduced.

Therefore, the voltage to be applied to the dielectric mirror layer 407 when driving the liquid crystal light valve 400 is lowered. Consequently, the voltage difference in the liquid crystal layer 410 due to changes in the impedance caused by irradiating light or stopping irradiation is increased, thereby improving the photosensitivity and the contrast of the image. Additionally, the drive voltage to be applied to the liquid crystal light valve 400 is lowered.

This arrangement also prevents a lowering of the reliability of liquid crystal due to moisture absorption in the dielectric mirror layer 407. Therefore, the optical characteristic and impedance of the liquid crystal light valve 400 are stabilized, and the disparity in the characteristics of the products is decreased. As a result, the quality is stabilized, and the yield is increased.

In this embodiment, metal was dispersed in the high refractive index layer of the dielectric mirror layer 407. However, it is possible to produce similar effects by dispersing metal in the low refractive index layer. Although Au was used as metal to be dispersed, it is not necessary to limit the metal to Au. For example, metal, such as nickel (Ni), copper (Cu), silver (Ag), and platinum (Pt), may be used.

[Embodiment 5]

Figure 11:
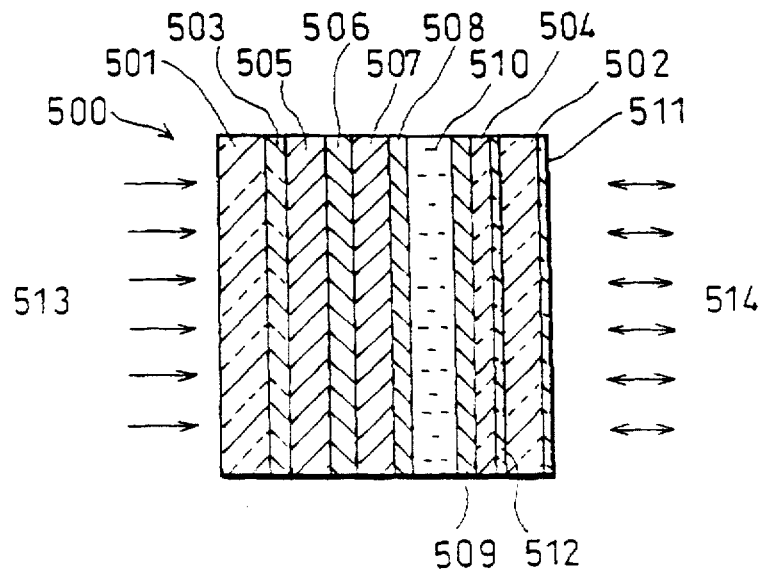
FIG. 11 is a sectional view showing a schematic structure of a liquid crystal light valve according to a fifth embodiment of the present invention.
Figure 12:
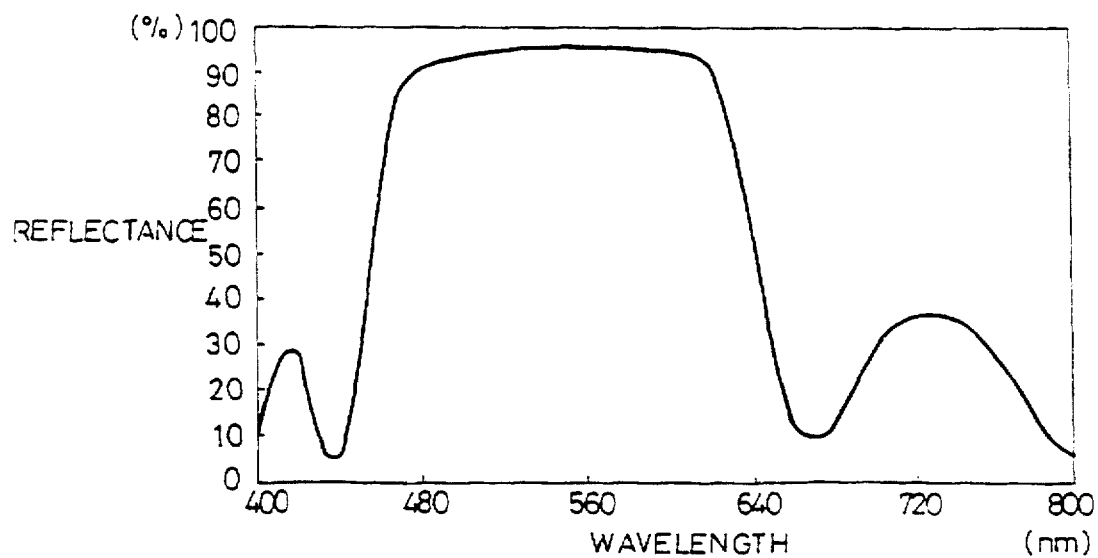
FIG. 12 is a graph showing the reflectance of a dielectric mirror layer of the liquid crystal light valve of FIG. 11.

The following description discusses a fifth embodiment of the present invention with reference to FIGS. 11 and 12.

As illustrated in FIG. 11, a liquid crystal light valve 500 of this embodiment is constructed by forming a transparent electrode 504 and an alignment film 509 in this order on a surface of a transparent substrate 502, forming a transparent electrode 503, a photoconducting layer 505, a light blocking layer 506, a dielectric mirror layer 507 and an alignment film 508 in this order on a transparent substrate 501, and sealing in a liquid crystal layer 510 between the transparent substrates 502 and 501.

Write light 513 for writing an image is incident on the transparent substrate 501. Read light 514 for reading out an image formed on the liquid crystal layer 510 is incident on the transparent substrate 502. Formed on both surfaces of the transparent substrate 502 are reflection reducing films 511 and 512 for preventing unnecessary reflection of the incident light. Similarly, reflection reducing films are formed on the transparent substrate 501, if necessary.

The following description explains a method for manufacturing the liquid crystal light valve 500 having the above-mentioned structure.

First, the transparent electrode 503 is formed by a CdO transparent conducting film on the transparent substrate 501 by sputtering. Then, a photoconducting layer 505 is formed by amorphous silicon nitride hydride (a-SiN:H) on the transparent electrode 503. The photoconducting layer 505 is formed so as to have a film thickness of 5μ using $SiH_4$, $H_2$, and an ammonia gas ($NH_3$) as raw materials by the plasma CVD method.

Next, the light blocking layer 506 is formed by CdTe on the photoconducting layer 505. Then, the dielectric mirror layer 507 is formed on the light blocking layer 506 by sputtering. The dielectric mirror layer 507 has a 16-layer structure in which a film of a low refractive index material with an optical film thickness of λ/4 and a film of a high refractive index material with the same optical film thickness are alternately laminated in 16 layers. The producing conditions of the dielectric mirror layer 507 of this embodiment are as follows.

$SiO_2$ was used as the low refractive index material, and $TiO_2$ containing a small amount of lead metatitanate ($PbTiO_3$) as a ferroelectric material was used as the high refractive index material. A mixed target formed by mixing $TiO_2$ and $PbTiO_3$ at a mixture ratio 100 to 1 and sintering the mixture was used for the production of the high refractive index layer, and a target formed by $SiO_2$ was used for the production of the low refractive index layer. Sputtering was performed using Ar as a sputtering gas at a substrate temperature of 200° C. A film with a padking density not lower than 0.9 was formed by setting the deposition rate of the high refractive index layer at 20 angstroms per second and the deposition rate of the low refractive index layer at 30 angstroms per second.

After the formation of the dielectric mirror layer 507 on the transparent layer 501, the alignment films 508 and 509 are formed on the transparent substrates 501 and 502, respectively, by a printing method for polyimides. The alignment films 508 and 509 are then subjected to rubbing processing. Next, substrate sections produced by the two pieces of substrates 501 and 502 are bonded, and liquid crystals are implanted between the alignment films 508 and 509 so as to form the liquid crystal layer 510.

A dielectric mirror layer was formed as a comparative example by alternately laminating $SiO_2$ and $TiO_2$ at deposition rates of 15 angstroms per second and 7 angstroms per second, respectively, at a substrate temperature of 300° C. with the EB device. Changes in the optical characteristic and the impedance of the dielectric mirror layer 507 and the comparative dielectric mirror layer were observed with time. The results are shown in Table 5.

TABLE 5

|  | Comparable Example | Embodiment 5 |
| --- | --- | --- |
| Center wavelength (nm) just after formation | 549.9 | 550.3 |
| Center wavelength (nm) after 10 days | 560.1 | 554.5 |
| Impedance (Ω) just after formation | 6.5E + 04 | 2.6E + 04 |
| Impedance (Ω) after 10 days | 2.5E + 04 | 2.0E + 04 |
| Drop rate (%) | 61.5 | 23.1 |

Table 5 shows the results just after the formation of mirror and the results after leaving the mirror in the atmosphere for 10 days. Changes in the optical characteristic indicate changes in the wavelength at the center of a band where the spectral reflectance characteristic of the dielectric mirror shown in FIG. 12 is not lower than 90%. The impedance is a value at 600 Hz when the area of the dielectric mirror layer is 1 $cm^2$.

As described above, the film formed by sputtering had a higher packing density than a film formed by EB evaporation. It is thus possible to have dense film quality. Consequently, the changes in the optical characteristic and in the impedance of the dielectric mirror layer caused by moisture absorption were significantly reduced.

Moreover, the impedance of the dielectric mirror layer 507 of this embodiment was lower than that of the comparative dielectric mirror layer. The reason for this is that, by dispersing a small amount of the ferroelectric material in the dielectric material of the high refractive index layer, the dielectric constant of the high refractive index layer becomes higher than that of the comparative dielectric mirror layer. Consequently, the capacitance component in the impedance is increased.

Therefore, the voltage to be applied to the dielectric mirror layer 507 when driving the liquid crystal light valve 500 is lowered. Consequently, the voltage difference in the liquid crystal layer 510 due to changes in the impedance caused by irradiating light or stopping irradiation is increased, thereby improving the photosensitivity and the contrast of the image. Additionally, the drive voltage to be applied to the liquid crystal light valve 500 is lowered.

This arrangement also prevents a lowering of the reliability of liquid crystal due to moisture absorption in the dielectric mirror layer 507. Therefore, the optical characteristic and impedance of the liquid crystal light valve 500 are stabilized, and the disparity in the characteristics of the products is decreased. As a result, the quality is stabilized, and the yield is increased.

In this embodiment, the ferroelectric material is dispersed in the high refractive index layer of the dielectric mirror layer 507. However, it is also possible to produce similar effects by dispersing metal in the low refractive index layer. Although $PbTiO_3$ was used as the ferroelectric material, it is not necessary to limit the ferroelectric material to $PbTiO_3$. For example, ferroelectric materials, such as barium titanate ($BaTiO_3$) and strontium titanate ($SrTiO_3$), may be used.

In this embodiment, the mixed dielectric material was mixed in the dielectric material of the dielectric mirror layer 507. However, it is also possible to mix a metallic material or semiconducting material as well as the ferroelectric material in the dielectric material.

[Embodiment 6]

Figure 13:
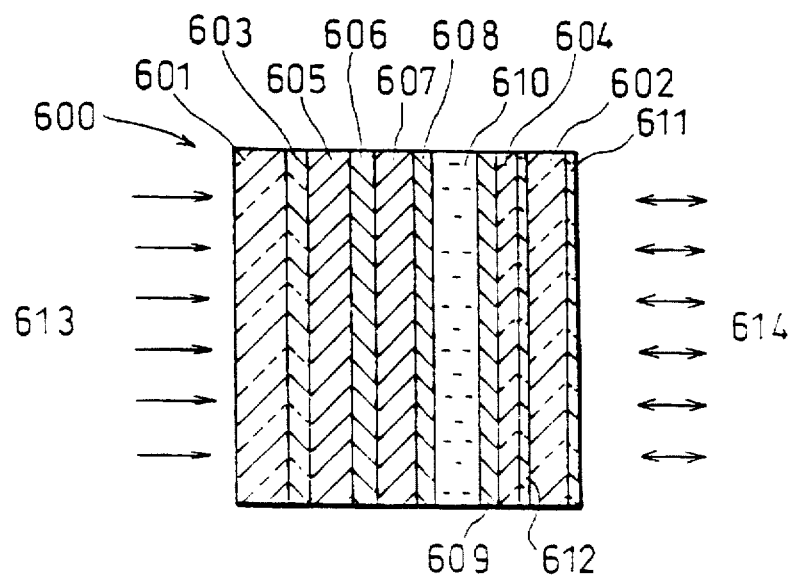
FIG. 13 is a sectional view showing a schematic structure of a liquid crystal light valve according to a sixth embodiment of the present invention.
Figure 14:
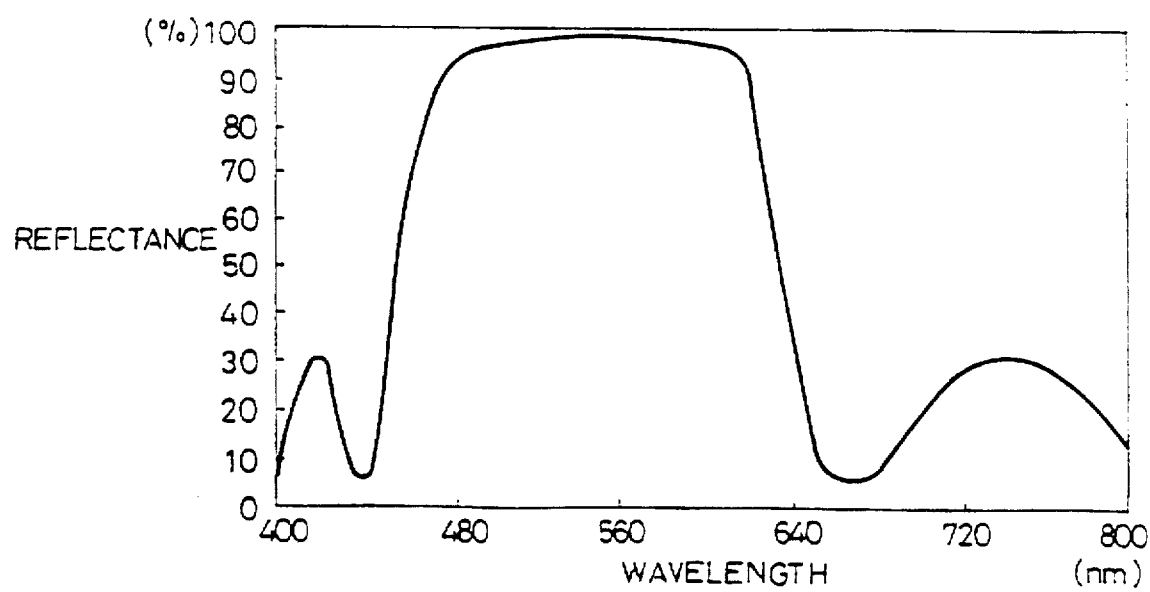
FIG. 14 is a graph showing the reflectance of a dielectric mirror layer of the liquid crystal light valve of FIG. 13.
Figure 15:
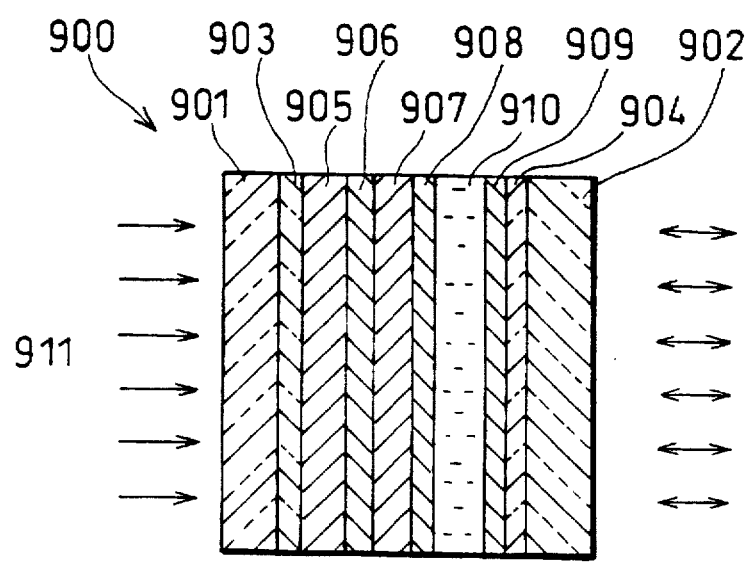
FIG. 15 is a sectional view showing a schematic structure of a conventional liquid crystal light valve.
Figure 16:
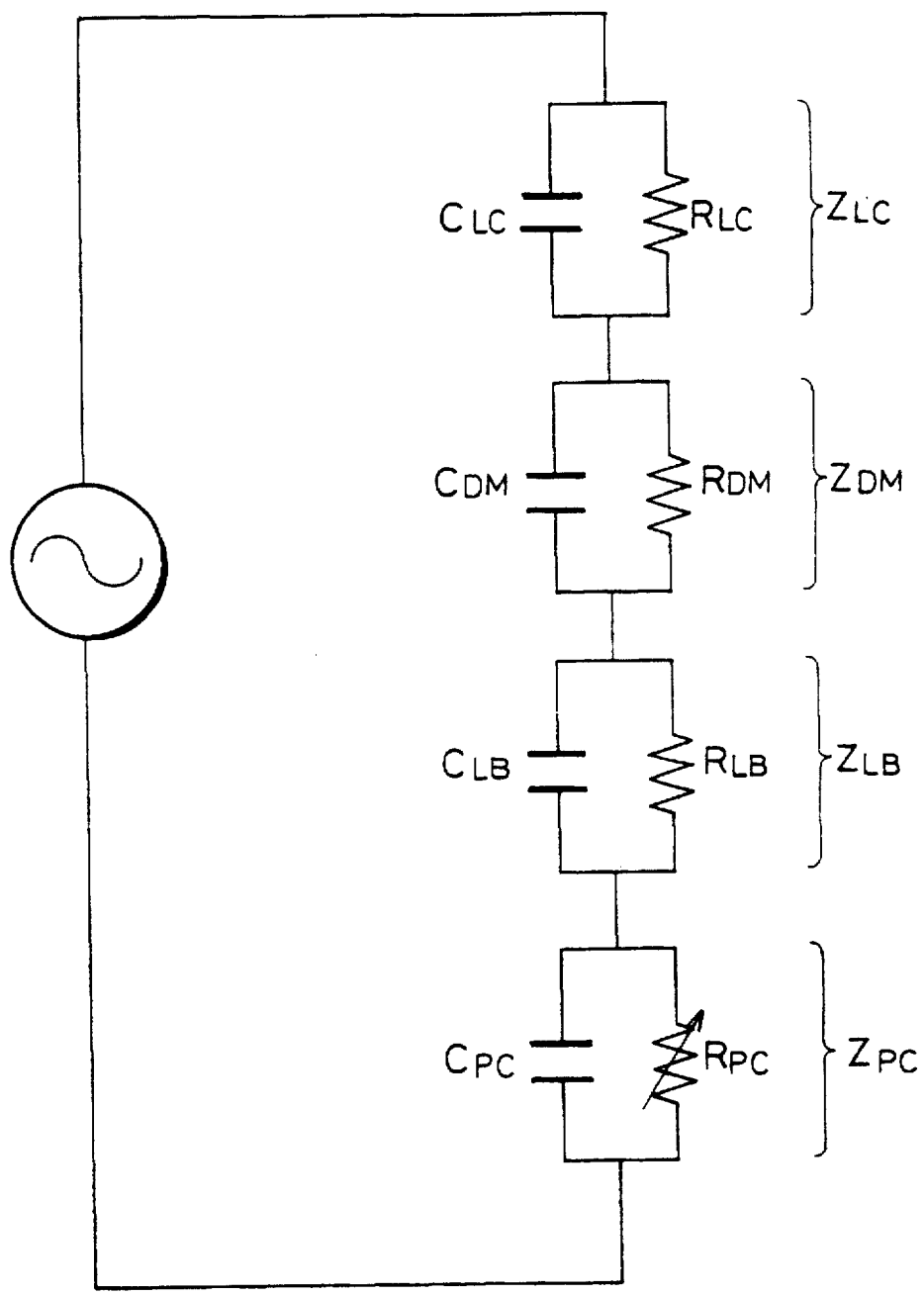
FIG. 16 is a circuit diagram showing an equivalent circuit for the liquid crystal light valve of FIG. 15.

The following description discusses a sixth embodiment of the present invention with reference to FIGS. 13 and 14.

As illustrated in FIG. 13, a liquid crystal light valve 600 of this embodiment is constructed by forming a transparent electrode 604 and an alignment film 609 in this order on a surface of a transparent substrate 602, forming a transparent electrode 603, a photoconducting layer 605, a light blocking layer 606, a dielectric mirror layer 607 and an alignment film 608 in this order on a transparent substrate 601, and sealing in a liquid crystal layer 610 between the transparent substrates 602 and 601.

Write light 613 for writing an image is incident on the transparent substrate 601. Read light 614 for reading out an image formed on the liquid crystal layer 610 is incident on the transparent substrate 602. Formed on both surfaces of the transparent substrate 602 are reflection reducing films 611 and 612 for preventing unnecessary reflection of the incident light. Similarly, reflection reducing films are formed on the transparent substrate 601, if necessary.

The following description explains a method for manufacturing the liquid crystal light valve 600 having the above-mentioned structure.

First, the transparent electrode 603 is formed by an ITO transparent conducting film on the transparent substrate 601 by sputtering. Then, the photoconducting layer 605 is formed by CdS on the transparent electrode 603. The photoconducting layer 605 is formed so as to have a film thickness of 9µ using a CdS sputtering target by the magnetron sputtering method.

Next, the light blocking layer 606 is formed on the photoconducting layer 605 by semiconducting super-fine-particle-dispersed glass. The super-fine-particle-dispersed glass is formed by dispersing semiconducting super fine particles of CdTe in $SiO_2$.

Then, the dielectric mirror layer 607 is formed on the light blocking layer 606 by sputtering. The dielectric mirror layer 607 has a 18-layer structure in which a film of a low refractive index material with an optical film thickness of $\lambda/4$ and a film of a high refractive index material with the same optical film thickness are alternately laminated in 18 layers. The producing conditions of the dielectric mirror layer 607 of this embodiment are as follows.

$SiO_2$ was used as the low refractive index material, and $SnO_2$ and $Ta_2O_5$ were used as the high refractive index material. $SnO_2$ is an oxide semiconductor with a resistance lower than the resistance of the dielectric material. The dielectric mirror layer 607 is produced by simultaneously sputtering $SnO_2$ and $Ta_2O_6$ (dielectric material) of the same refractive index at a deposition rate of 22 angstroms per second to form a film of the high refractive index material having a lower impedance than $Ta_2O_2$ and by sputtering $SiO_2$ at a deposition rate of 30 angstroms per second to form a film of the low refractive index material with a packing density not lower than 0.9.

After the formation of the dielectric mirror layer 607 on the transparent layer 601, the alignment films 608 and 609 are formed on the transparent substrates 601 and 602, respectively, by a printing method for polyimides. The alignment films 608 and 609 are then subjected to rubbing processing. Next, substrate sections produced by the two pieces of substrates 601 and 602 are bonded, and liquid crystals are implanted between the alignment films 608 and 609 so as to form the liquid crystal layer 610.

A dielectric mirror layer was formed as a comparative example by alternately laminating mirror layers of $SiO_2$ and $Ta_2O_5$ at deposition rates of 15 angstroms per second and 7 angstroms per second, respectively, at a substrate temperature of 300° C. with the EB device. Changes in the optical characteristic and the impedance of the dielectric mirror layer 607 and the comparative dielectric mirror layer were observed with time. The results are shown in Table 6.

TABLE 6

|  | Comparable Example | Embodiment 6 |
|---|---|---|
| Center wavelength (nm) just after formation | 549.6 | 549.9 |
| Center wavelength (nm) after 10 days | 560.2 | 554.1 |
| Impedance (Ω) just after formation | 7.5E + 04 | 3.8E + 04 |
| Impedance (Ω) after 10 days | 3.1E + 04 | 3.0E + 04 |
| Drop rate (%) | 58.7 | 21.1 |

Table 6 shows the results just after the formation of mirror and the results after leaving the mirror in the atmosphere for 10 days. Changes in the optical characteristic indicate changes in the wavelength at the center of a band where the spectral reflectance characteristic of the dielectric mirror shown in FIG. 14 is not lower than 90%. The impedance is a value at 600 Hz when the area of the dielectric mirror layer is 1 $cm^2$.

As described above, the film formed by sputtering had a higher packing density than a film formed by EB evaporation. It is thus possible to have dense film quality. Consequently, the changes in the optical characteristic and in the impedance of the dielectric mirror layer caused by moisture absorption were significantly reduced.

Moreover, the impedance of the dielectric mirror layer 607 of this embodiment was lower than that of the comparative dielectric mirror layer. The reason for this is that, by mixing the oxide semiconducting material in the dielectric material of the high refractive index layer, the conductivity of the high refractive index layer becomes higher than that of the dielectric mirror layer of the comparative example. Consequently, the amount of resistant component in the impedance is reduced.

Therefore, the voltage to be applied to the dielectric mirror layer 607 in driving the liquid crystal light valve 600 is lowered. Consequently, the voltage difference in the liquid crystal layer 610 due to changes in the impedance caused by irradiating light or stopping irradiation is increased, thereby improving the photosensitivity and the contrast of the image. Additionally, the drive voltage to be applied to the liquid crystal light valve 600 is lowered.

This arrangement also prevents a lowering of the reliability of liquid crystal due to moisture absorption in the dielectric mirror layer 607. Therefore, the optical characteristic and impedance of the liquid crystal light valve 600 are stabilized, and the disparity in the characteristics of the products is decreased. As a result, the quality is stabilized, and the yield is increased.

In this embodiment, $SnO_2$ was used as the high refractive index material of the dielectric mirror layer 607. However, it is not necessary to limit the high refractive index material to $SnO_2$. For example, oxide semiconducting materials, such as CdO, ZnO and $In_2O_3$, may be used as the high refractive index material.

Moreover, in this embodiment, the semiconducting material is mixed with the dielectric material of the high refractive index layer of the dielectric mirror layer 607. As to the material to be mixed into the dielectric material, materials formed by mixing a metallic material and/or a ferroelectric material into the semiconducting material may be used.

In the above-mentioned embodiments, the dielectric mirror layer was formed by using a film with a high packing density for at least one layer on the liquid crystal side and using films with a low packing density for the other layers. With this structure, it is possible to produce a dielectric mirror layer which has a lower impedance and shows less changes in the optical characteristic and impedance characteristic with time compared to a conventional dielectric mirror layer.

The above-mentioned embodiments used a dielectric mirror layer using an oxide semiconductor with a conductivity not higher than $1\times10^{-7}$ S/cm, or a dielectric mirror layer formed by a conducting material, a semiconducting material or a ferroelectric material, or a dielectric material containing a mixture thereof. With the use of such materials, it is possible to produce a dielectric mirror layer which has a lower impedance and shows less changes in the optical characteristic and impedance characteristic with time compared to the conventional dielectric mirror layer. In order to optimize the resolution of the liquid crystal light valve and the impedance of the dielectric mirror layer, it is desirable to set the conductivity σ of the oxide semiconductor within a range $1\times10^{-9} \leq \sigma \leq 1\times10^{-7}$ S/cm.

Hence, the photosensitivity and the contrast of the image are improved with the application of the dielectric mirror layer to a liquid crystal light valve, achieving the liquid crystal light valve with a low drive voltage. Moreover, since a lowering of the reliability of liquid crystal due to the moisture absorption in the dielectric mirror layer is prevented, the optical characteristic and impedance are stabilized. It is therefore possible to provide liquid crystal light valves with less disparity of products.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal light valve comprising:

a pair of transparent substrates having transparent electrodes;

a liquid crystal layer formed by sealing in liquid crystals between said transparent substrates;

a photoconducting layer, formed on one of said transparent electrodes, for varying a voltage to be applied to said liquid crystal layer with a change in impedance according to an amount of light irradiated; and a dielectric mirror layer, located between said photoconducting layer and said liquid crystal layer, for reflecting light which has passed through said liquid crystal layer, said dielectric mirror layer having a plurality of dielectric films laminated, including a high packing density portion formed by at least one of said dielectric films, located on a liquid crystal side, and a low packing density portion with a packing density lower than a packing density of said high packing density portion, said low packing density portion being formed by the dielectric film other than the one used for said high packing density portion.

2. The liquid crystal light valve according to claim 1, wherein said dielectric mirror layer has a structure in which the dielectric film formed by a low refractive index material and the dielectric film formed by a high refractive index material are alternately laminated.

3. The liquid crystal light valve according to claim 2, wherein said low refractive index material is silicon dioxide, and said high refractive index material is titanium dioxide.

4. A liquid crystal light valve comprising:

a pair of transparent substrates having transparent electrodes;

a liquid crystal layer formed by sealing in liquid crystals between said transparent substrates;

a photoconducting layer, formed on one of said transparent electrodes, for varying a voltage to be applied to said liquid crystal layer with a change in impedance according to an amount of light irradiated; and a dielectric mirror layer, located between said photoconducting layer and said liquid crystal layer, for reflecting light which has passed through said liquid crystal layer, said dielectric mirror layer having a plurality of dielectric films laminated, said dielectric mirror layer being formed by an oxide semiconductor whose conductivity σ is $1\times10^{-14} < \sigma \leq 1\times10^{-7}$ S/cm.

5. The liquid crystal light valve according to claim 4, wherein the conductivity σ of said oxide semiconductor is $1\times10^{-9} < \sigma \leq 1\times10^{-7}$ S/cm.

6. The liquid crystal light valve according to claim 4, wherein said dielectric mirror layer includes a high packing density portion formed by at least one of said dielectric films, located on a liquid crystal side, and a low packing density portion with a packing density lower than a packing density of said high packing density portion, said low packing density portion being formed by the dielectric film other than the one used for said high packing density portion.

7. The liquid crystal light valve according to claim 6, wherein said dielectric mirror layer has a structure in which the dielectric film formed by a low refractive index material and the dielectric film formed by a high refractive index material are alternately laminated.

8. The liquid crystal light valve according to claim 7, wherein said low refractive index material is silicon dioxide, and said high refractive index material is indium oxide.

9. A liquid crystal light valve comprising:

a pair of transparent substrates having transparent electrodes;

a liquid crystal layer formed by sealing in liquid crystals between said transparent substrates;

a photoconducting layer, formed on one of said transparent electrodes, for varying a voltage to be applied to said liquid crystal layer with a change in impedance according to an amount of light irradiated; and a dielectric mirror layer, located between said photoconducting layer and said liquid crystal layer, for reflecting light which has passed through said liquid crystal layer, said dielectric mirror layer having a plurality of dielectric films laminated, said dielectric films containing a conducting material, a ferroelectric material, a mixture of conducting material and ferroelectric material, or a mixture of conducting material, ferroelectric material and semiconducting material.

10. The liquid crystal light valve according to claim 9, wherein said dielectric mirror layer includes a high packing density portion formed by at least one of said dielectric films, located on a liquid crystal side, and a low packing density portion with a packing density lower than a packing density of said high packing density portion, said low packing density portion being formed by the dielectric film other than the one used for said high packing density portion.

11. The liquid crystal light valve according to claim 10, wherein said dielectric mirror layer has a structure in which the dielectric film formed by a low refractive index material and the dielectric film formed by a high refractive index material are alternately laminated, and at least one of said dielectric film formed by the low refractive index material and said dielectric film formed by the high refractive index material contains the conducting material, the semiconducting material, the ferroelectric material, or the mixture thereof.

12. The liquid crystal light valve according to claim 11, wherein said low refractive index material is silicon dioxide, and said high refractive index material is titanium dioxide.

13. A method for manufacturing a liquid crystal light valve, comprising the steps of:

(1) forming a transparent electrode on each of a first transparent substrate and a second transparent substrate;

(2) forming a photoconducting layer and a light blocking layer on said transparent electrode formed on said first transparent substrate;

(3) forming a dielectric mirror layer by laminating a plurality of dielectric films on said light blocking layer so that a high packing density portion is formed by at least one layer of the dielectric films as an outer layer and that a low packing density portion with a packing density lower than a packing density of said high packing density portion is formed by the dielectric film other than the one used for said high packing density portion; and (4) forming an alignment film on said first transparent substrate on which said transparent electrode, said photoconducting layer, said light blocking layer and said dielectric mirror layer have been formed, forming an alignment film on said second transparent substrate on which said transparent electrode has been formed, and sealing in liquid crystals between said alignment films of said first transparent substrate and said second transparent substrate arranged to face each other.

14. The method for manufacturing a liquid crystal light valve according to claim 13, wherein said high packing density portion and said low packing density portion are formed by deposition in step (3).

15. The method for manufacturing a liquid crystal light valve according to claim 14, wherein a higher substrate temperature and a lower deposition rate are used for forming said high packing density portion than a substrate temperature and a deposition rate for forming said low packing density portion.

16. The method for manufacturing a liquid crystal light valve according to claim 15, wherein said high packing density portion and said low packing density portion are deposited by an electron-beam deposition method.

17. The method for manufacturing a liquid crystal light valve according to claim 15, wherein said high packing density portion and said low packing density portion are deposited by an ion-beam assisted deposition method.

18. The method for manufacturing a liquid crystal light valve according to claim 13, wherein said high packing density portion and said low packing density portion are formed by sputtering in step (3).

* * * * *